(12) United States Patent
Garcia et al.

(10) Patent No.: US 11,572,288 B2
(45) Date of Patent: Feb. 7, 2023

(54) WASTE PEPTONE DISPOSAL SYSTEM AND METHODS

(71) Applicant: SMITHFIELD FOODS, INC., Smithfield, VA (US)

(72) Inventors: Hector Garcia, Los Angeles, CA (US); Vladimir Lobato, Long Beach, CA (US); Everett Sandoval, Azusa, CA (US); James Davidian, Whittier, CA (US)

(73) Assignee: SMITHFIELD FOODS, INC., Smithfield, VA (US)

( * ) Notice: Subject to any disclaimer, the term of this patent is extended or adjusted under 35 U.S.C. 154(b) by 599 days.

(21) Appl. No.: 16/510,098

(22) Filed: Jul. 12, 2019

(65) Prior Publication Data

US 2020/0079659 A1 Mar. 12, 2020

Related U.S. Application Data

(60) Provisional application No. 62/755,020, filed on Nov. 2, 2018, provisional application No. 62/729,956, filed on Sep. 11, 2018.

(51) Int. Cl.
*C02F 1/02* (2006.01)
*C02F 101/38* (2006.01)
*C02F 103/34* (2006.01)
*C02F 101/34* (2006.01)

(52) U.S. Cl.
CPC .......... *C02F 1/025* (2013.01); *C02F 2101/34* (2013.01); *C02F 2101/38* (2013.01); *C02F 2103/343* (2013.01); *C02F 2301/046* (2013.01)

(58) Field of Classification Search
CPC ........ B01D 2257/304; B01D 2257/404; B01D 2257/406; B01D 53/005; C02F 1/025; C02F 1/66; C02F 2101/34; C02F 2101/38; C02F 2103/343; C02F 2209/008; C02F 2209/02; C02F 2209/40; C02F 2301/046; C02F 2303/04
See application file for complete search history.

(56) References Cited

U.S. PATENT DOCUMENTS

| | | | | |
|---|---|---|---|---|
| 5,523,109 A | * | 6/1996 | Hellweg | A23L 7/17 426/620 |
| 5,607,840 A | * | 3/1997 | Van Gorp | A23K 20/147 435/68.1 |
| 7,384,555 B1 | * | 6/2008 | Yasui | C02F 3/1273 210/627 |
| 2003/0138391 A1 | * | 7/2003 | Miller | A61Q 5/02 424/76.1 |
| 2005/0176936 A1 | * | 8/2005 | Neumuller | A23J 1/14 424/725 |
| 2006/0141604 A1 | * | 6/2006 | Kumar | C02F 3/341 210/601 |
| 2006/0141605 A1 | * | 6/2006 | Kumar | C12N 1/20 435/262.5 |
| 2012/0107868 A1 | * | 5/2012 | Lee | C12P 21/06 435/68.1 |

FOREIGN PATENT DOCUMENTS

GB 992201 5/1965

\* cited by examiner

*Primary Examiner* — Blaine Lankford
(74) *Attorney, Agent, or Firm* — McCarter & English, LLP

(57) ABSTRACT

A waste peptone disposal system is provided, the system utilizing steam to increase the temperature of the waste peptone and provide active homogenous mixing inside a thermally insulated tank. Steam is introduced through a steam sparging system and directly applied to the waste peptone to reduce noxiousness, allowing the facility to dispose of the processed waste peptone through a wastewater system.

42 Claims, 4 Drawing Sheets

WASTE PEPTONE DISPOSAL SYSTEM AND METHODS

CROSS-REFERENCE TO RELATED APPLICATIONS

This application claims the benefit of commonly assigned U.S. Provisional Patent Application No. 62/755,020, which was filed on Nov. 2, 2018, and U.S. Provisional Patent Application No. 62/729,956, which was filed on Sep. 11, 2018. The entire contents of the foregoing provisional patent applications are incorporated herein by reference.

FIELD OF INVENTION

The inventions described herein relate generally to a system and methods for processing waste peptone.

BACKGROUND

Heparin is used as a blood thinner and has great commercial value. Processes for obtaining heparin and the resulting products have been described by U.S. Pat. No. 5,607,840 and GB Patent No. 992,201. Currently, the heparin extraction process requires an excess quantity of enzymes to hydrolyze the mucosa tissue with at least one proteolytic enzyme, binding the heparin product through an anion exchange resin, yielding a hydrolyzed product which includes heparin and by-product waste "waste peptone" which contains hydrolysatic mixture derived from the mucosa of swine. On a dry basis, waste peptone derived from heparin production processes is approximately 55% by weight crude protein and up to 30% by weight ash.

For both regulatory and practical reasons, the current practice is to land apply waste peptone. However, the transportation and handling costs of the waste peptone, often amounting to several thousand gallons produced daily, are high. Waste peptone may be used as a nutritional supplement for animals due to its protein content. Again, however, handling and transportation costs are high.

Waste peptone is generated by the hydrolyzation of the mucosa tissue, which results in heparin and the by-product "waste peptone". Catalytic solutions are added in the process to allow for the binding; however, if the enzymatic activity in the solution was not deactivated through a pH adjustment, the reaction will continue, rendering a low yield. The waste includes hydrolysates, salts, and possibly phosphorous. The waste peptone solution retains at least 30% of the enzymatic activity of the starting proteolytic enzymes used to hydrolyze the mucosa, as determined by the enzymatic assay utilized by the enzyme's manufacturer. The waste peptone also produces gases including $H_2S$, $NH_3$, $H_2SO_x$, $NO_x$.

Enzymatic activity from waste peptone can be irreversibly denatured by lowering the enzymatic activity through excessive amounts of dry heat, placing into a pre-treatment system, biodigestion, and/or allowing the reaction to complete with the existing organic material. However, these methods are very cost intensive. For example, it may take about 3 days for the reaction to run to completion. This incurs costs due to storage of the waste peptone during this time, which can be produced at about 15,000 gallons of waste peptone produced a day at a single facility.

There exists a need in the art for improved methods of disposing of waste peptone.

SUMMARY OF INVENTION

In one embodiment, the invention may provide a method for extending the enzymatic activity of waste peptone that may comprise heating waste peptone to a temperature of about 140° F. to 220° F. for about 10-30 minutes. Rather than about 3 days for the enzymatic activity to take place using traditional methods, the exemplary method can process a batch of thousands of gallons of waste peptone in about 20 minutes. The waste peptone may be generated by a heparin extraction process and comprise amino acids, non-protein organics, fats, bisulfite, salts, residual bacterial alkaline proteases, preferably comprising bacterial subtilisin-like enzymes, or a combination thereof.

In any embodiment, the temperature may be about 140° F., 145° F., 150° F., 155° F., 160° F., 165° F., 170° F., 175° F., 176° F., 177° F., 178° F., 179° F., 180° F., 181° F., 182° F., 183° F., 184° F., 185° F., 186° F., 187° F., 188° F., 189° F., 190° F., 200° F., 210° F., or 220° F. The temperature may be about 140° F. to 190° F., 180° F. to 190° F., 170° F. to 190° F., 160° F. to 220° F. The temperature may be about 180° F.

In many embodiments, the waste peptone may be heated for about 10, 11, 12, 13, 14, 15, 16, 17, 18, 19, 20, 21, 22, 23, 24, 25, 26, 27, 28, 29, or 30 minutes. The waste peptone may be heated for about 10-25 minutes, 15-20 minutes, or 15-30 minutes. The waste peptone may be heated for about 20 minutes.

In many embodiments, the waste peptone may be processed in a thermally insulated tank.

In many embodiments, the waste peptone may be constantly agitated during heating.

In many embodiments, the waste peptone may be circulated from the bottom of the tank to the middle of the tank during heating.

In many embodiments, the waste peptone may be circulated by a recirculation pump.

In many embodiments, the gases produced during the heating are collected. The collected gases may be processed in a thermal oxidizer, preferably a regenerative thermal oxidizer.

In many embodiments, the method may further comprise injecting steam into the waste peptone. The method may comprise two counter-current steam streams injected into the waste peptone. The steam streams may be injected into the waste peptone at two or more points. The steam may be injected by means of a steam sparger. In some embodiments, the tank may comprise one, two, or three steam spargers that introduce steam into the waste peptone.

In many embodiments, waste peptone may be added to the top of the tank.

In many embodiments, the heating process may be performed a single time. In many embodiments, the heating process may be repeated, preferably 1, 2, 3, 4, 5, 6, 7, 8, 9, or 10 times.

In many embodiments, resultant waste peptone is safe to discharge as regular waste water.

The invention also provides for a method for reducing the enzymatic activity of waste peptone comprising (a) obtaining waste peptone, preferably generated by a heparin extraction process; (b) placing said waste peptone into a thermally insulated tank; (c) directly injecting steam into said thermally insulated tank via a steam sparger to heat the waste peptone to about 180° F. for 20 minutes; (d) recirculating the waste peptone from the bottom of the tank to the middle of the tank via a recirculation pump; (e) collecting gases produced from said tank; and (f) optionally, repeating steps (a)-(e) 1, 2, 3, 4, 5, 6, 7, 8, 9, or 10 times.

The invention also provides for an apparatus comprising a thermally insulated tank coupled to a recirculation pump, wherein the intake is located at the bottom of the tank and the return is located in the approximate middle of the tank, a steam sparger configured for direct injection of steam into the tank, means for collecting gases produced in the tank, and means for releasing the tank contents.

In accordance with embodiments of the present disclosure, an exemplary method for processing waste peptone is provided. The method includes heating waste peptone via steam to a temperature of about 140° F. to about 220° F. for about 10-60 minutes. The waste peptone can be generated by a heparin extraction process. The waste peptone comprises amino acids, non-protein organics, fats, bisulfite, salts, residual bacterial alkaline proteases, or a combination thereof. The bacterial alkaline protease can be a bacterial subtilisin-like enzyme. The temperature can be about 140° F., 145° F., 150° F., 155° F., 160° F., 165° F., 170° F., 175° F., 176° F., 177° F., 178° F., 179° F., 180° F., 181° F., 182° F., 183° F., 184° F., 185° F., 186° F., 187° F., 188° F., 189° F., 190° F., 200° F., 210° F., or 220° F. The temperature can be about 140° F. to 190° F., 180° F. to 190° F., 170° F. to 190° F., or 160° F. to 220° F. The temperature can be about 180° F.

The steam can be directly introduced into the waste peptone. The steam can be introduced at a pressure of about 70-100 PSI. The steam can be introduced at a pressure of about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 PSI. The steam can be introduced at a pressure of about 70-95 PSI, 80-95 PSI, 85-95 PSI, 75-90 PSI, 80-90 PSI, or, 70-85 PSI.

The waste peptone can be heated for about 10-25 minutes, 15-20 minutes, 10-20 minutes, 15-30 minutes, 15-45 minutes, or 30-50 minutes. The waste peptone can be heated for about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes. The waste peptone can be heated for about 20, 30, 40, 45, 50, or 60 minutes.

The waste peptone is processed in a thermally insulated tank. The waste peptone can be constantly agitated during heating by introduction of the steam into the waste peptone. The waste peptone can circulated from the bottom of the tank to the middle of the tank during heating. The waste peptone is circulated by a recirculation pump. Gases produced during the method are collected. The collected gases are processed in a thermal oxidizer. The thermal oxidizer is a regenerative thermal oxidizer. The gases produced during the method comprise $H_2S$, $NH_3$, $H_2SO_x$, $NO_x$, and mixtures thereof.

The steam is introduced directly into the waste peptone. A single steam stream can be injected into the waste peptone. Two counter-current steam streams can be injected into the waste peptone. The steam streams can be injected into the waste peptone at two or more points. The steam can be injected by means of a substantially circular steam sparger. The steam can be injected by means of a substantially elliptical steam sparger. The steam can be injected by means of two steam spargers. The steam spargers can comprise a series of 2, 3, 4, 5, or 6 steam spargers.

The pH of the waste peptone can be about pH 12-13 at a beginning of the process, preferably at time t=0 minutes. The pH of the waste peptone can be reduced from about pH 12-13 at the beginning of the process to about pH 7 at the end of the process, preferably at time=30-60 minutes. The processed waste peptone has a bacterial count of less than about 20,000 CFU/g. The processed waste peptone can be substantially odor free. The waste peptone can be added to the top of the tank.

The heating process can be repeated. The method can be repeated 1, 2, 3, 4, 5, 6, 7, 8, 9, or 10 times per batch of waste peptone. The method can be a batch process. The resultant waste peptone is safe to discharge as regular waste water.

In accordance with embodiments of the present disclosure, an exemplary method for reducing the enzymatic activity of waste peptone is provided. The method includes obtaining waste peptone, placing the waste peptone into a thermally insulated tank, directly injecting steam into the waste peptone in the thermally insulated tank via a steam sparger to heat the waste peptone to about 175-190° F. for about 15-45 minutes, recirculating the waste peptone from an area at or near a bottom of the thermally insulated tank to an area at or near a middle of the thermally insulated tank via a recirculation pump fluidically coupled to the thermally insulated tank, and collecting gases produced from the thermally insulated tank. The waste peptone can be generated by a heparin extraction process. The method optionally includes repeating steps 1, 2, 3, 4, 5, 6, 7, 8, 9, or 10 times.

In accordance with embodiments of the present disclosure, an exemplary system or apparatus for waste peptone processing is provided. The apparatus includes a thermally insulated tank coupled to a recirculation pump. An intake of the recirculation pump is located at or near a bottom of the thermally insulated tank and a return of the recirculation pump is located in at or near a middle of the thermally insulated tank. The apparatus includes a steam sparger configured for direct injection of steam into the thermally insulated tank. The apparatus includes means for collecting gases produced in the thermally insulated tank, means for measuring temperature within the thermally insulated tank, means for measuring pH within the thermally insulated tank, and means for releasing the thermally insulated tank contents.

The apparatus includes a coupler system coupled to the thermally insulated tank to control one or more components of the apparatus via one or more commands. The coupler system comprises one or more processors, and one or more memories coupled to the one or more processors, the one or more memories including instructions operable to be executed by the one or more processors, the one or more processors configured to control the apparatus. The coupler system is configured to communicate with the apparatus via wired communication, wireless communication, or any combination thereof.

The means for measuring temperature (e.g., temperature sensors) are disposed at one or more locations inside the thermally insulated tank. The steam sparger can be substantially circular. The steam sparger can be substantially elliptical. The steam sparger comprises two tubular steam spargers. The steam sparger can be disposed 1-40 cm from a portion of the tank, preferably from the bottom of the thermally insulated tank. The steam sparger can be disposed 2-6 cm from a portion of the tank, preferably from the bottom of the thermally insulated tank. The steam sparger can be isolated or secluded from one or more portions of the thermally insulated tank.

DETAILED DESCRIPTION OF THE INVENTION

Definitions

Figure 1:
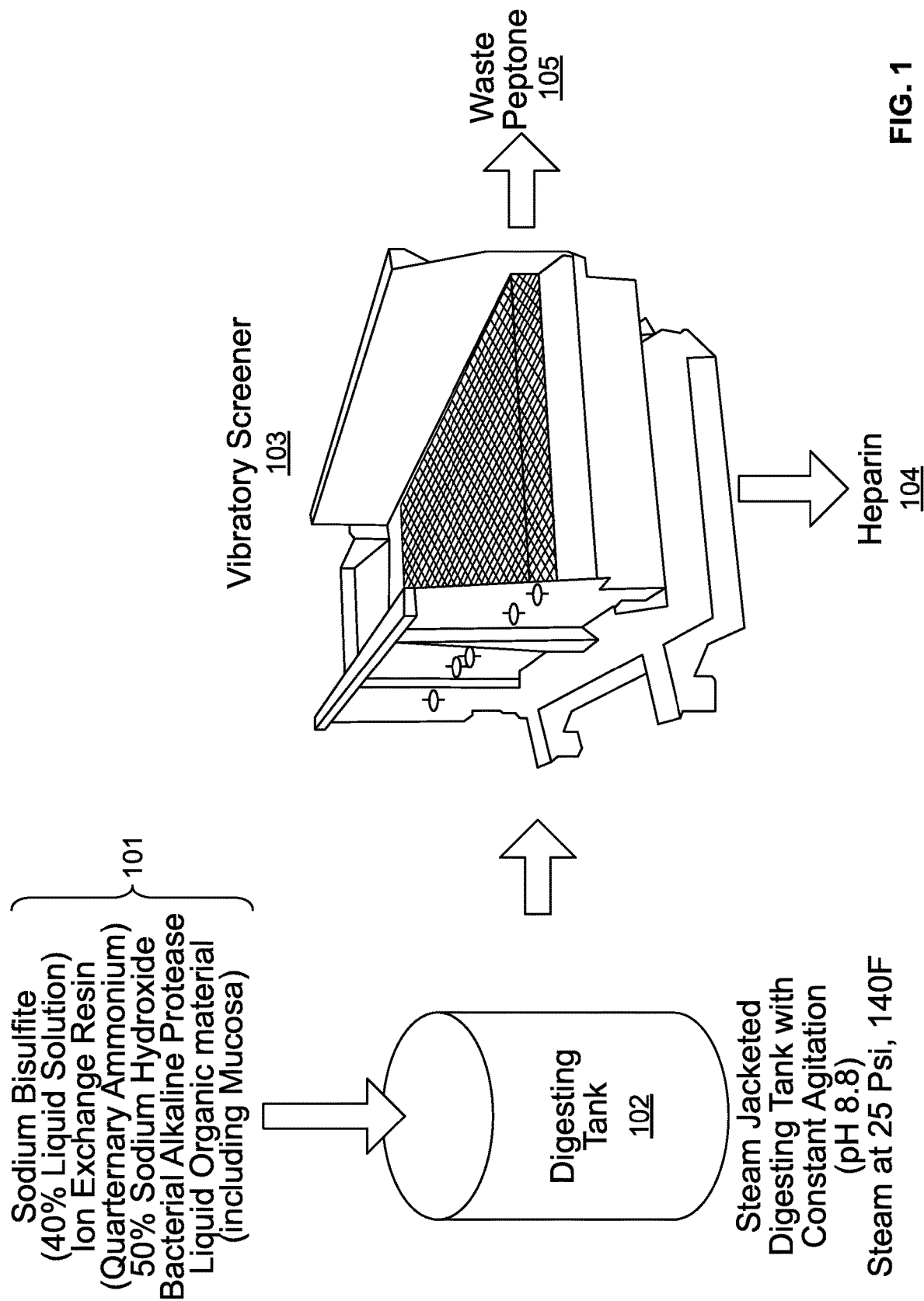
FIG. 1 depicts mass balance based on the heparin extraction process (based on 6,500 hogs per day).

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

"Waste peptone," as used herein, refers broadly to a byproduct of heparin isolation from animal mucosa comprising amino acids, non-protein organics, fats, bisulfite, ammonium, and salts (e.g., sodium, chloride, potassium, calcium, and magnesium).

Heparin Extraction Process

Heparin is used as a blood thinner and has great commercial value. Processes for recovering heparin and the resulting products have been described by U.S. Pat. No. 5,607,840 and GB 992,201. On a dry basis, typical waste peptone derived from heparin production processes is approximately 55% by weight crude protein and up to 30% by weight ash. Waste peptone is viscous with a strong odor making it difficult to handle.

It is estimated that proteolytic enzymes are added in quantities (up to 1.5 grams of enzyme per kilogram of protein present in the tissue) that increase the costs of carrying out both the heparin extraction and the waste peptone processing. This results in a substantial amount of enzymatic activity remaining long after the binding reaction has stopped. Waste peptone is odorous because of the enzymatic activity and the amount of organic material left. If this material is introduced into the pretreatment system, which processes protein-containing materials that can be hydrolyzed, the reaction is reinvigorated due to a pH adjustment, e.g., the waste peptone has a high pH of about 12-13, adding water (pH 7) dilutes the base present, lowering the pH. Thus, the pH is close to neutral since most of the sodium hydroxide has been consumed.

Heparin extraction from mucosa may comprise the following steps:

1. Preserve raw mucosa material with sodium bisulfite (supplied in 40% liquid solution).
2. Preserved mucosa material is collected into 5,800-gallon steam jacketed digesting tank with constant agitation.
3. Ion exchange resin (Quaternary Ammonium Functionality Resin Bead) is added to the digesting tank.
4. Four hours later, the pH is raised from around 5.8 to 8.8 with use of 50% sodium hydroxide solution.
5. Steam is then supplied to the digester jacket at 25 PSI in order to heat the product to 60° C.
6. Once pH and temperature requirements are achieved generally within 1-90 minutes, preferably about 60 minutes, bacterial alkaline protease mixture is added. Bacterial alkaline protease mixtures may comprise subtilisin-like enzymes.
7. The mild enzyme digestion takes place overnight, e.g., 1-12 hours, preferably about 12 hours, under constant agitation. Temperature is maintained at 60° C.
8. After 1-12 hours, preferably about 12 hours, the product is drained over a vibratory screener to separate the heparin-rich resin and the waste peptone.
9. Heparin-rich resin is cleaned with hot potable water, floated to remove fat, mixed with about 20 pounds of sodium bisulfite solution (supplied in 40% liquid solution), dried, and packaged in a shipping drum.
10. Production is shipped with completed batch record for heparin extraction and yield check.
11. Sodium bisulfite is used to clean the lines.

The following mass balance, based on the heparin extraction process (based on 6,500 hogs per day), was developed as shown in FIG. 1.

Waste Peptone

The methods and systems described herein overcome the problem of waste peptone by providing reduction of enzymatic activity remaining in the waste peptone through an active peptone humidification process. Broadly, the reduced enzymatic activity in the waste peptone is the result of a heated hydrolyzation process that increases the efficiency of enzymatic activity, thereby promoting the biological reaction rate of material consumption and resulting in the denaturization of the enzyme.

In some examples, there is pH treatment in the actual peptone waste tank itself. By adding water, an "acid" is introduced to the extremely high caustic environment found in the waste peptone itself. By adding water and heat, the pH is lowered activating the catalytic reaction. As the enzyme is consumed hydrolyzation is further promoted. At the end of the reaction, the pH is close to neutral since most of the sodium hydroxide has been consumed.

Injecting high velocity steam directly into the waste peptone accomplishes the following:

1. Creates a pH adjustment to re-start the enzymatic activity, e.g., drops the pH from about 12-13 to about pH 7, through the addition of water via introduction of steam.
2. Adds heat to the system via steam to volatize the enzyme, e.g., about 180° F.
3. Deactivates the enzyme activity by maintaining the temperature at about 180° F. for about 20 minutes.
4. Destructs bacteria, lowering the amount of bacteria to below about 20,000 CFU/g.

5. Creates a humidification process that virtually eliminates all enzymatic activity in less than about 30 minutes.

The current energy-intensive method reduces the remaining enzymatic activity in the peptone solution through dry heat to denature it, but the resulting material cannot be given to livestock and must instead be used as fertilizer for non-edibles. Additionally, the active humidification process mixes the material homogenously to ensure the enzyme is denaturized, unlike an evaporator, which raises the material until the enzymes volatilize.

The inventors surprisingly found that heating the waste peptone with a continuous feed of steam at about 85-90 PSI in a thermally insulated tank at about 175-195° F. for about 15-45 minutes, preferably about 180° F. for about 20 minutes, results in a significant reduction is noxious compounds and gases. Unexpectedly, this allowed the resultant waste peptone to be discharged as regular waste water, greatly reducing costs associated with waste peptone disposal.

Waste Peptone Processing System

Figure 2:
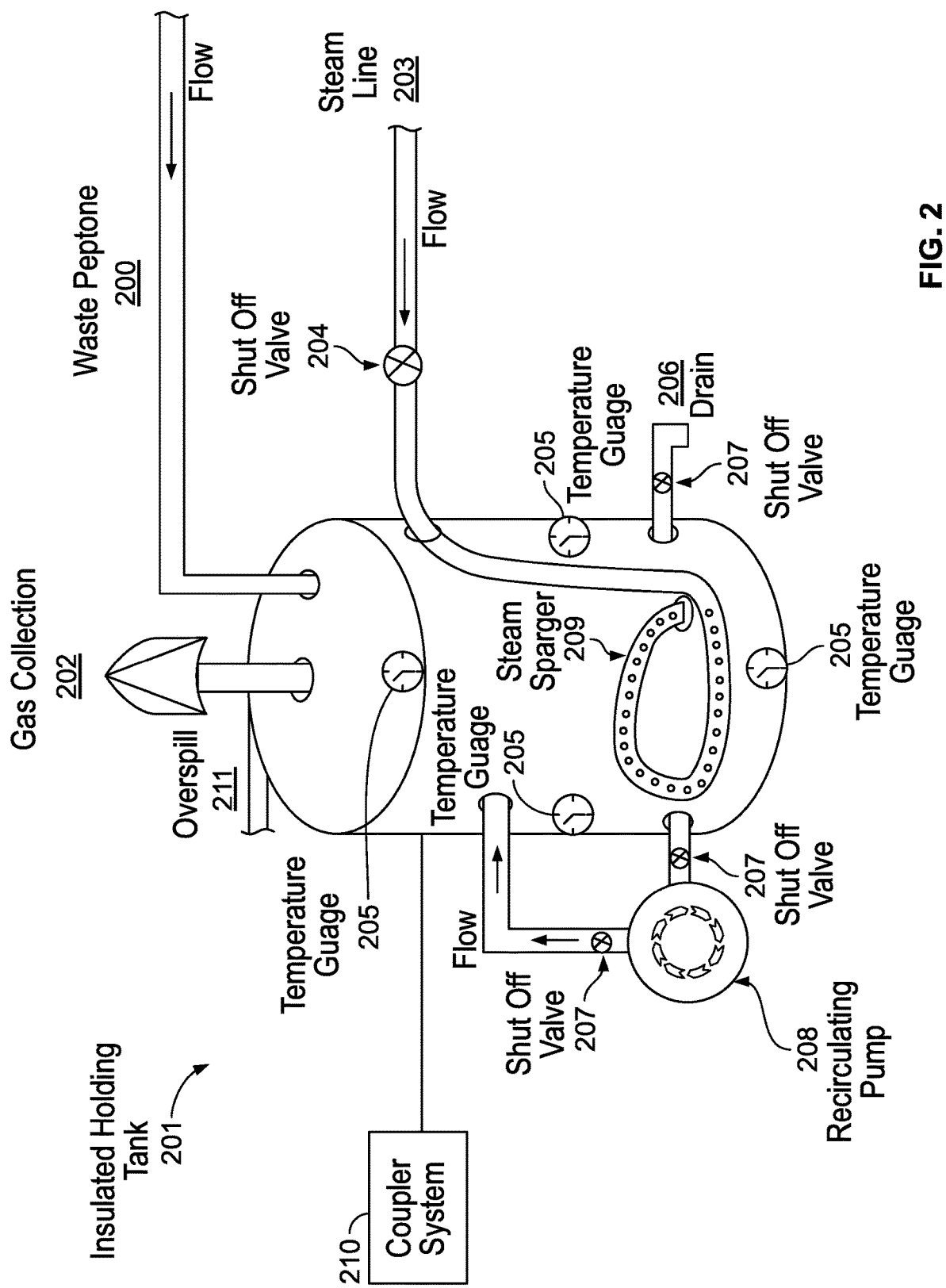
FIG. 2 depicts an exemplary configuration of a waste peptone reactor.

In reference to FIG. 2, the system described herein utilizes an agitation system which incorporates the placement of a steam sparger system (e.g., steam sparger 209) at the bottom of the tank 201. The sparger system may comprise two sparger steam systems on either side of the tank. The sparger system may be a single circular sparger system, or a double circular sparger system. In one embodiment, the steam sparger system may be spaced about 2-3 three inches from the inner surface of the base of the tank 201. In one embodiment, the steam sparger system can be spaced about 1 inch from the inner surface of the base of the tank 201. In one embodiment, the steam sparger system can be disposed immediately adjacent to or abutting the inner surface of the base of the tank 201.

The tank may comprise an insulated holding tank 201. The sparging system deviates from latent heating in that a gaseous solvent is added to the waste peptone 200 to promote increased chemical reactions through enzymatic activity, while also raising the temperature of the waste peptone through convection. Steam is introduced through a two-inch inner diameter tube (e.g., steam line 203) that runs the perimeter of the tank 201, approximately three inches above the base of the tank 201. The steam line 203 (e.g., a distal end of the steam line 203) can enter into the tank 201 at a position near or adjacent to the top of the tank 201, and extends downwards inside the tank 201 to a position at or near the bottom of the tank 201 (e.g., a proximal end of the steam line 203). The steam line 203 can be substantially solid (e.g., free of holes) except for the section of the steam line 203 disposed at or near the bottom of the tank 201. The steam line 203 can form a curved substantially circular, semi-circular or oval configuration the proximal end of the steam line 203 at or near the bottom of the tank 201, with such section of the steam line 203 extending along a plane substantially parallel to the bottom of the tank 201.

In one embodiment, rather than a single steam line 203 curved at the bottom of the tank 201, the holding tank 201 can include two steam lines 203 curved at the bottom of the tank 201 and spaced from each other. In one embodiment, rather than a curved steam line 203 at the bottom of the tank 201, the tank 201 can include one or more linear steam lines 203 extending in a substantially straight line at the bottom of the tank 201. In one embodiment, the steam line 203 can curve and be positioned along the inner perimeter at or near the bottom of the tank 201 (e.g., adjacent to the side walls of the tank 201). In one embodiment, the steam line 203 can curve and be positioned offset or spaced from the inner surface of the side walls of the tank 201.

The steam line 203 includes holes drilled into the tube at intervals to add steam to the waste peptone 200, providing the needed mixing while adding heat to the solution. In one embodiment, the holes can be drilled only along the top surface of the steam line 203 at the proximal end (e.g., at the surface of the steam line 203 facing the top surface of the tank 201. In one embodiment, the holes can be drilled radially along the steam line 203 (e.g., at the top surface, bottom surface, and side surfaces of the steam line 203 at the proximal end. For example, the tube may have 0.25 inch diameter holes drilled into the tube at intervals of about, e.g., 1 inch, 2 inches, 3 inches, or the like, to introduce steam into the waste peptone 200.

The steam 203 introduced directly into the waste peptone 200 allows for a more even distribution of water throughout the tank 201. Also, the direct injection of steam 203 provides agitation to mix the waste peptone 200. Traditionally, mixing waste peptone is difficult as it is a thick, viscous solution. While traditional attempts to mix the waste peptone have failed, incorporation of the exemplary steam sparger 209 into the tank 201 to add the steam provides for successful mixing of the waste peptone 200. The steam introduced via the steam line 203 also acts as an "acid" to lower basic pH of the waste peptone from about pH 12-13 to about pH 7 at the beginning of the process, preferably from time t=0 minutes start to time t=30 to 60 minutes end. At this lower pH, e.g., pH 7, the release of $H_2S$ is significantly reduced. A plurality of valves, such as shut off valves 204, 207 may be configured to control various flows, such as steam line 203, drain 206, and recirculating pump 208. As explained below, FIG. 2 also includes a coupler system 210 that may be added to integrate existing temperature control and create an automatic process for the apparatus. Overspill piping 211 may be included, for example at the top of the tank 201, to carry overspill from tank 201.

Figure 4:
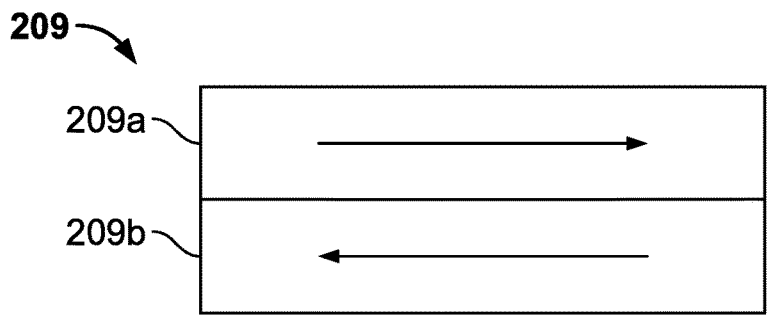
FIG. 4 depicts an exemplary configuration of a steam sparger tube of a waste peptone reactor.

To create the active peptone humidification process, the tube of the steam sparger 209 can be halved and fed two separate steam lines to create two counter-current steam mixing streams (e.g., steam lines 209a, 209b of FIG. 4). In some examples, sparging tube of the steam sparger 209 is substantially circular or elliptical. The tube of the steam sparger 209 may be disposed at a distance from the bottom portion of the tank 201, and may be isolated or secluded from a bottom portion of the tank 201 such that tube 209 is not in contact with tank 201. In some examples, the tube of the steam sparger 209 can be in contact with the tank 201. In some examples, one or more valves may be provided to control flow. In some examples, the system may include a shut-off valve 207 to drain 206 to waste water from the tank 201.

In combination with the sparging system, a recirculation pump 208 can be incorporated into the system to ensure homogenous agitation optimizes performance. In some embodiments, the bottom tube for the recirculating pump (inlet into pump) is disposed at the bottom of the tank 201 to prevent settling. Although illustrated in FIG. 2 as disposed offset from the bottom of the tank 201, in one embodiment, the bottom tube of the recirculation pump 208 can be disposed at the bottom of the tank 201. Although illustrated in FIG. 2 as disposed at an intermediate height of the tank 201, in one embodiment, the outlet tube of the recirculation pump 208 can fluidically connect at or near the top of the tank 201. In some embodiments, the recirculation pump 208 can operate substantially continuously to maintain movement of the waste peptone from the bottom of the tank 201 to the top of the tank 201. In some embodiments, the recirculation pump 208 can be selectively operated or operated based on a predetermined interval to maintain movement of the waste peptone from the bottom of the tank 201 to the top of the tank 201.

One or more temperature sensors or gauges 205 can be disposed at various locations throughout the tank 201 to verify that temperature is evenly distributed. In some examples, the one or more temperature sensors or gauges 205 may be configured to detect a range comprising 0° F.-250° F. In some examples, the temperature sensors or gauges 205 may be located at a plurality of portions or areas (e.g., spaced throughout the tank 201), which may be predetermined, such as at a left portion, a right portion, a top portion, and a bottom portion of the tank 201. The multiple gauges 205 disposed in different positions within the tank 201 can be used to determine the temperatures at different areas of the tank 201. The pumping capacity improves mass transfer rates by increasing reaction rates through mixing the solvent with the material. To minimize environmental, health, or safety concerns, a negative pressure line going to the RTO was added at the top of the tank 201 to capture any exhaust or emissions 202 (e.g., $H_2S$, $NH_3$, $H_2SO_x$, $NO_x$) resulting from the process. The removal of gases 202 during processing may allow for additional material to be added to the batch during the processing.

Figure 5:
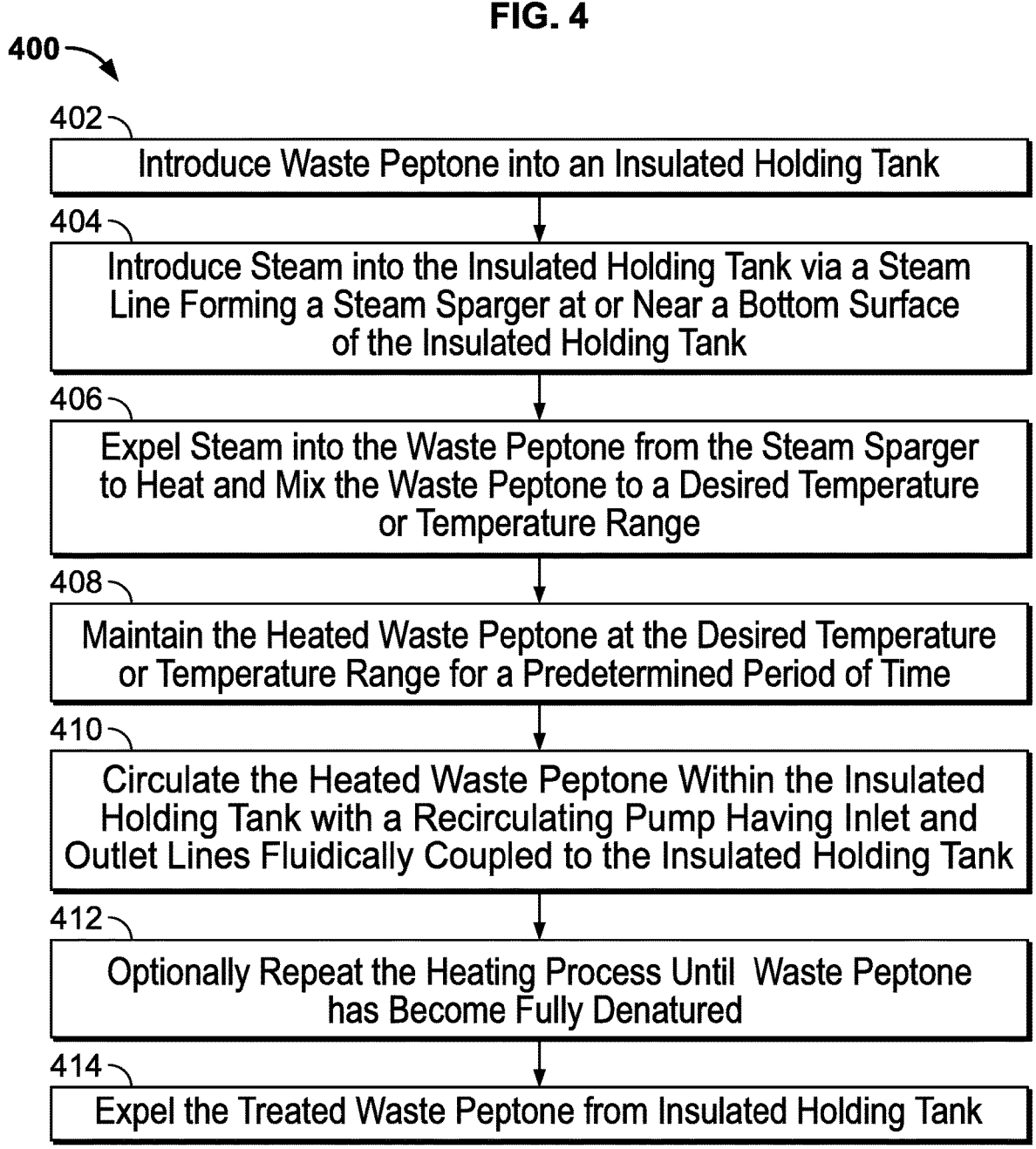
FIG. 5 depicts an exemplary process of operating a waste peptone reactor.

In reference to FIG. 5, a flowchart of an exemplary process 400 of operating a waste peptone reactor (e.g., tank 201) is provided. In step 402, waste peptone is introduced into the insulated holding tank. The waste peptone can be introduced via a waste peptone line connected to the tank at or near the top surface of the tank. The waste peptone can be introduced as a single batch based on the volume of the tank, or can be continuously introduced into the tank at a predetermined or adjustable flow rate. In step 404, steam is introduced into the insulated holding tank via a steam line forming a steam sparger at or near the bottom surface of the insulated holding tank. A shut-off valve in the steam line can be used to regulate the flow of steam into the steam sparger. The steam sparger forms at least one substantially circular, semi-circular, elliptical or linear section at the proximal end at or near the bottom surface of the insulated holding tank having multiple spaced holes for release of steam at the bottom of the tank. At step 406, steam is expelled into the waste peptone from the steam sparger to heat and mix the waste peptone to a desired temperature or temperature range. In some embodiments, rather than a single steam line, two or more steam lines can be used to introduce steam to two or more steam spargers located at or near the bottom of the tank. The location of the steam sparger at the bottom of the tank ensures the waste peptone is sufficiently heated and mixed.

At step 408, the heated waste peptone is maintained at a desired temperature or temperature range for a predetermined period of time to properly process the waste peptone. At step 410, the heated waste peptone is circulated or mixed within the heated insulated holding tank with a recirculating pump having an inlet and outlet lines fluidically coupled to the insulated holding tank. The recirculating pump can be operated continuously to maintain movement and mixing of the waste peptone, or can be operated at predetermined intervals of time. At step 412, the heating process can be optionally repeated until the waste peptone has become fully denatured. One or more sensors distributed within the tank can be used to measure characteristics of the waste peptone to determine when the waste peptone has reached the desired denatured level. At step 414, the treated waste peptone can be expelled from the insulated holding tank via a drain located at or near the bottom of the tank.

Figure 3:
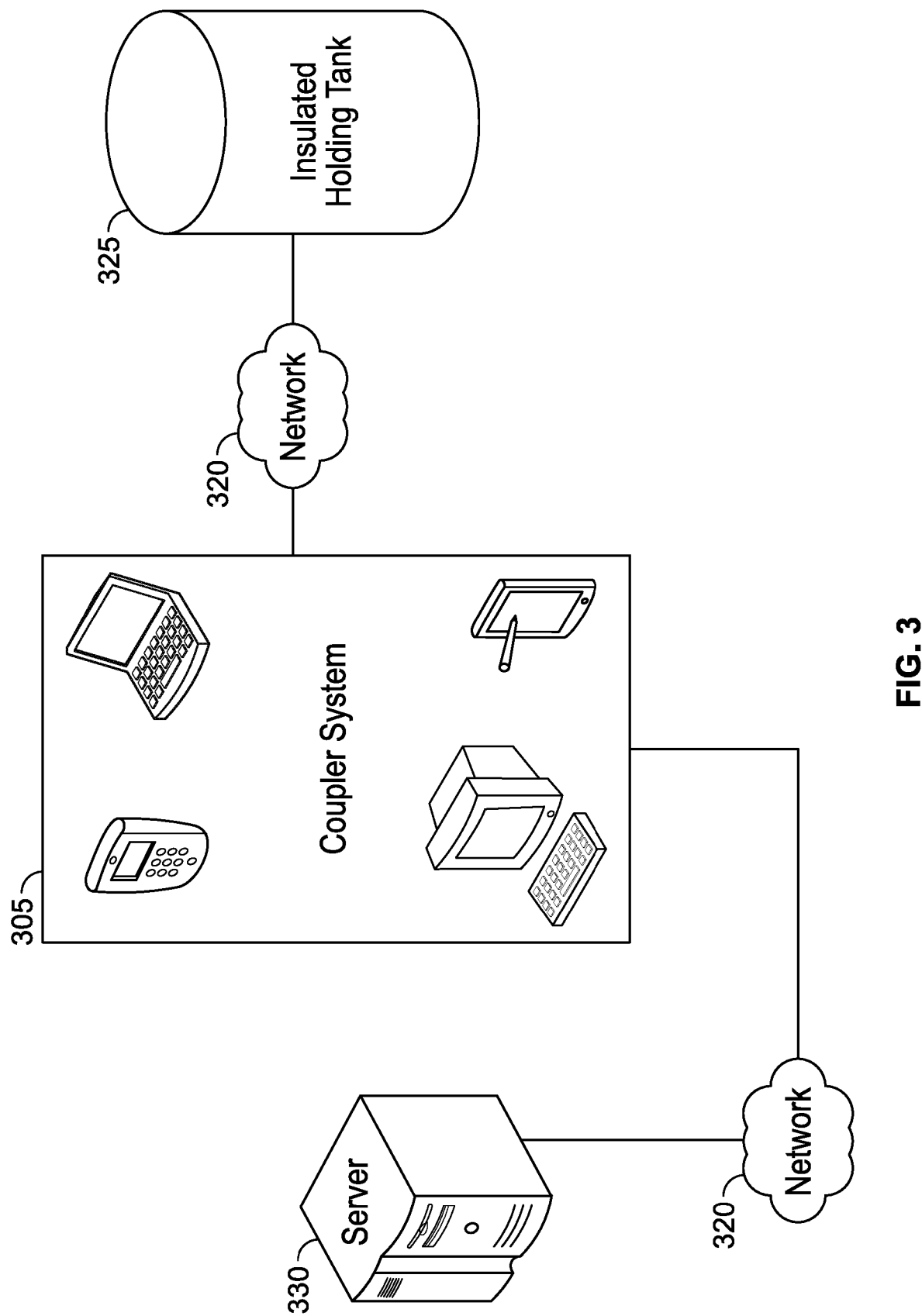
FIG. 3 depicts an exemplary configuration of coupler system in communication with a waste peptone reactor.

In reference to FIG. 3, a coupler system 305 can be used to integrate existing temperature control and create an automatic process for the apparatus 325 of FIG. 2 (e.g., the insulating holding tank). In some examples, the coupler system 305 may comprise one or more network-enabled computers having one or more processors, coupled to memory, configured to execute a variety of commands associated with the apparatus 325, including but not limited to, temperature control and various flows of FIG. 2. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device.

In various examples according to the present disclosure, coupler system 305 may be configured to execute one or more applications (not shown), such as software applications, that enable, for example, network communications with one or more components of the apparatus 325 and transmit and/or receive data. The apparatus 325 may comprise an insulated holding tank, similar to insulated holding tank 201 of FIG. 2. In some examples, an application may be installed on the coupler system 305 (e.g., coupler system 210 of FIG. 2). One or more applications may include instructions to perform one or more processes described herein. Coupler system 305 may be in communication with one or more servers 330 via one or more networks 320 to execute one or more commands in response to receiving and/or transmitting one or more requests from one or more servers 330.

Coupler system 305 may be configured as a central system, server or platform to control and call various data at different times to execute a plurality of workflow actions associated with the apparatus 325. Coupler system 305 may be configured to connect to one or more databases (not shown). In some examples, coupler system 305 may be not be in communication with one or more servers 330 to control and call various data at different times to execute a plurality of workflow actions associated with the apparatus 325.

One or more networks 320 may be one or more of a wireless network, a wired network or any combination of wireless network and wired network, and may be configured to connect coupler system 305 to the apparatus 325. For example, one or more networks 320 may include one or more of a fiber optics network, a passive optical network, a cable network, an Internet network, a satellite network, a wireless LAN, a Global System for Mobile Communication (GSM), a Personal Communication Service (PCS), a Personal Area Network (PAN), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth network, or any other wired or wireless network for transmitting and receiving a data signal.

In addition, one or more networks 320 may include, without limitation, telephone lines, fiber optics, IEEE Ethernet 802.3, a wireless network, a wide area network (WAN), a wireless personal area network (WPAN), a local area network (LAN), a body area network (BAN), a global network such as the Internet, a cellular network, or any combination thereof. One or more networks 320 may utilize one or more protocols of one or more network elements to which they are communicatively coupled. One or more networks 320 may translate to or from other protocols to one or more protocols of network devices. Although one or more networks 320 may be depicted as a single network, it should be appreciated that according to one or more examples, one or more networks 320 may comprise a plurality of interconnected networks, such as, for example, the Internet, a service provider's network, a cable television network, corporate networks, and home networks.

In various examples, one or more networks 320 may be configured to provide data communication between coupler system 305 and the apparatus 325. For example, data may be communicated between coupler system 305 and apparatus 325 through one or more networks 320, such as but not limited to the Internet or other network, and data may be communicated directly between coupler system and/or one or more databases without passing through a server. Accordingly, one or more networks 320 may be one or more of the Internet, Near Field Communication (NFC), Radio Frequency Identification (RFID), Bluetooth, Wi-Fi, and/or the like.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions (e.g., non-transitory, computer-readable medium storing instructions for operation of the exemplary system and/or apparatus). Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. In some examples, various components (e.g., servers, computers, processors, etc.) of the coupler system may be separately provided. The functions described as being performed at various components may be performed at other components, and the various components may be combined or separated. Other modifications also may be made.

The peptone hydrogenation reactor system creates high hydrogen gas rates without tapering off as the reaction progresses which is common for other reactors. The steam is sufficiently supplied and mixed due to the pump sizing. The pump selected must not have a substantial drop in the horsepower delivered to the system, which results in a loss of mass transfer capability. To combat this issue, the sparging system has pre-defined parameters for active humidification, resulting in near-homogenous mixing, and the pump has a higher pumping capacity and lower power drop off to promote good mixing required in the reaction. The result is more power than is currently available for mixing. Expensive two-speed motors or ACVF drives are not required. Motor overload potential is also reduced since the peptone hydrogenation reactor design does not rely on a speed change for performance.

The waste peptone is subjected to a single heating cycle or repeated heating cycles up to about 170° F. to 212° F. The total number of heating cycles may vary depending on the batch itself. Acceleration of the enzymatic activity by increasing the upper temperature of the heating phase can be accomplished only within very narrow limitations. If not, the denaturing process stops and the material will then go through a slower decay process. In any event, the denaturing process is continued until the waste peptone has become fully and properly denatured. Sensors disposed within the tank can be used to determine the stage and/or level of the denaturing process to ensure the heating cycle is repeated until the waste peptone has become fully and properly denatured. Enzymatic activity was reduced by identifying trace chemicals including the production of Pyruvic Acid. The waste peptone may be continuous introduced into the tank for processing. In some embodiments, the waste peptone is treated in batch fashion, with a single batch of waste peptone introduced, treated, expelled, and then the second batch is introduced. For example, in some embodiments, one batch of waste peptone can be introduced into the tank, processed, and expelled from the tank prior to introduction of a second batch of waste peptone into the tank. As a further example, in some embodiments, waste peptone can be continuously circulated through the tank and the heating cycle can be repeated to ensure proper processing of the waste peptone prior to expelling from the tank.

The hydrogenation reaction starts with a high hydrogen flow rate to the system, resulting in a pH adjustment that reactivates the enzymatic activity. The process improves mass transfer over dry heat design because the active mixing ensures water is being mixed with the waste peptone. It is important to re-incorporate water into the batch to maintain the reaction and improve hydrogen utilization. Hydrogenation reactions also generate a large amount of heat, which must be removed from the process. The negative pressure provided by the regenerative thermal oxidizer (RTO) accomplishes this by promoting velocity towards it.

EXAMPLES

Example 1

System for Hydrolyzation of Waste Peptone

The system and methods described herein lower the enzymatic activity found in waste peptone allowing the treated waste peptone to be processed in a regular municipal wastewater system.

The waste peptone dehydrolyzation comprises following equipment:
  (a) Daily Mucosa Production (Gals)
  (b) Daily Waste Peptone (Gals)
  (c) Insulted Tank to hold 1.25% of Daily Waste Peptone production.
  (d) Steam Sparger
  (e) Temperature gauges (f) Recirculating pump/pipe from bottom to top.

(g) Steam Line (90 psi)

(h) Air control equipment (e.g. RTO/scrubber)

(i) Negative Air pressure to feed Air Control Equipment.

(j) Overspill piping to wastewater drain nearby.

(k) CIP system to clean the sparger after processing.

The method comprises homogenous heating of the waste peptone to 190 F for approximately 30 minutes through an air sparger configured for direct injection of steam into the tank under negative pressure. Homogenous heating is achieved through the steam sparger and the recirculation system that moves the waste peptone from the bottom to the top of the tank. The gases produced are treated preferably with regenerative thermal oxidizer.

Process time is from 45 minutes to three hours; and it can be automatically set. Once the temperature has been achieved, the treated waste peptone is then blended with the wastewater and sent to a pre-treatment system. The pre-treatment system processes approximately 1 Million gallons of wastewater daily.

For 4,000 gallons of waste peptone produced daily, processing costs (e.g. surcharge, utilities, compost) are approximately $35,000 per year, i.e., a significant reduction in the costs of handling and disposing of waste peptone as compared to traditional methods of processing waste peptone.

Example 2

Analysis of Waste Peptone Composition

A day's production of heparin from 6,500 hogs was analyzed including the waste peptone composition. With reference to FIG. 1, amounts 101 including 34,548 lbs of mucosa was admixed with 290 lbs sodium bisulfite (40% liquid solution), 72 lbs of ion exchange resin (quaternary ammonium), 400 lbs 50% NaOH, 5 lbs of bacterial alkaline protease liquid in a 5,800-gallon steam jacketed digesting tank 102 with constant agitation (pH 8.8). This was poured onto a vibratory screener 103 where the ion exchange resins bound with heparin 104 were separated from waste peptone 105.

TABLE 1

Composition of Waste Peptone (based on a 34,361 lbs sample)

| Component | Percentage of Composition | Amount (pounds) |
| --- | --- | --- |
| Amino Acids | 57% | 19,586 |
| Non-protein organics | 13% | 4,467 |
| Fats (oils and grease) | <1% | 27,489 |
| Bisulfite (3.1% sulfur) | 8.2% | 2,818 |
| Sodium | 9.1% | 3,127 |
| Chloride | 10% | 3,436 |
| Potassium | 1.8% | 618 |
| Ammonium | 1.0% | 344 |
| Calcium + Magnesium | <1% | 3,092 |

The Total Sulfur Content is about 4,300 mg/l.

Waste peptone is a viscous, foul-smelling colloidal liquid that is difficult to transport, mix, or otherwise work with. The colloidal nature of waste peptone leads to phase separation that makes waste peptone resistant to heating. Further, the colloidal nature and subsequent phase separation also leads to waste peptone retaining heat in different phases. Regulatory requirements prohibit producers of heparin from releasing the waste peptone into municipal waste water systems.

Example 3

Waste Peptone Processing Method

The method described herein results in low bacterial counts with the final solution having a maximum standard plate count of 20,000 CFU/g. As a result of these low counts, the odor of mucosa tissue is substantially reduced.

Enzyme activity after the process described herein was determined through the following:

1. The creation of Pyruvic Acid and the removal of Lactic Acid. Pyruvic acid supplies energy to living cells through the citric acid cycle (also known as the Krebs cycle) when oxygen is present (aerobic respiration). If oxygen is lacking, Pyruvic acid ferments to produce lactic acid. However, Lactic Acid decreased which means that hydrolyzation was occurring.
2. Resultant material had a lower pH adjustment.
3. The temperature gauge had a temperature spike on the outgoing vapors to the regenerative thermal oxidizer at the boiling point of the enzyme.
4. Nitrite as N and sulfur were significantly reduced, eliminating the strong, noxious, signature odor of waste peptone.
5. The complete active humidification process lasted less than one hour after the waste peptone was introduced into the peptone hydrogenation reactor.

When the material was introduced into the pretreatment wastewater system, the water had no discoloration, and total suspended solids (TSS) remained at normal concentrations compared to baseline data. However, chemical oxygen demand (COD) was slightly higher than the baseline data.

All publications, patents, and published patent applications mentioned in this specification are herein incorporated by reference, in their entirety, to the same extent as if each individual publication, patent, or published patent application was specifically and individually indicated to be incorporated by reference.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A method for processing waste peptone, comprising:
   introducing waste peptone into a tank, the tank including a steam sparger disposed at a bottom of the tank and spaced from a bottom surface of the tank; and
   heating waste peptone via steam with the steam sparger to a temperature of about 140° F. to about 220° F. for about 10-60 minutes.

2. The method of claim 1, wherein the waste peptone is generated by a heparin extraction process.

3. The method of claim 1, wherein the waste peptone comprises amino acids, non-protein organics, fats, bisulfite, salts, residual bacterial alkaline proteases, or a combination thereof.

4. The method of claim 3, wherein the bacterial alkaline protease is a bacterial subtilisin enzyme.

5. The method of claim 1, wherein the temperature is about 140° F., 145° F., 150° F., 155° F., 160° F., 165° F., 170° F., 175° F., 176° F., 177° F., 178° F., 179° F., 180° F., 181° F., 182° F., 183° F., 184° F., 185° F., 186° F., 187° F., 188° F., 189° F., 190° F., 200° F., 210° F., or 220° F.

6. The method of claim 1, wherein the temperature is about 140° F. to 190° F., 180° F. to 190° F., 170° F. to 190° F., or 160° F. to 220° F.

7. The method of claim 1, wherein the temperature is about 180° F.

8. The method of claim 1, wherein the steam is directly introduced into the waste peptone with the steam sparger.

9. The method of claim 8, wherein the steam is introduced at a pressure of about 70-100 PSI.

10. The method of claim 9, wherein the steam is introduced at a pressure of about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 PSI.

11. The method of claim 9, wherein the steam is introduced at a pressure of about 70-95 PSI, 80-95 PSI, 85-95 PSI, 75-90 PSI, 80-90 PSI, or, 70-85 PSI.

12. The method of claim 1, wherein the waste peptone is heated for about 10-25 minutes, 15-20 minutes, 10-20 minutes, 15-30 minutes, 15-45 minutes, or 30-50 minutes.

13. The method of claim 1, wherein the waste peptone is heated for about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes.

14. The method of claim 1, wherein the waste peptone is heated for about 20, 30, 40, 45, 50, or 60 minutes.

15. The method of claim 1, wherein the tank is a thermally insulated tank, and the waste peptone is processed in the thermally insulated tank.

16. The method of claim 1, wherein the waste peptone is constantly agitated during heating.

17. The method of claim 1, wherein the waste peptone is circulated from the bottom of the tank to a middle of the tank during heating.

18. The method of claim 17, wherein the waste peptone is circulated by a recirculation pump.

19. The method of claim 1, wherein gases produced during the method are collected.

20. The method of claim 19, wherein the collected gases are processed in a thermal oxidizer.

21. The method of claim 20, wherein the thermal oxidizer is a regenerative thermal oxidizer.

22. The method of claim 19, wherein the gases produced during the method comprise $H_2S$, $NH_3$, $H_2SO_x$, $NO_x$, and mixtures thereof.

23. The method of claim 8, wherein two counter-current steam streams are injected into the waste peptone with the steam sparger.

24. The method of claim 23, wherein the steam streams are injected into the waste peptone at two or more points with the steam sparger.

25. The method of claim 8, wherein the steam sparger is a substantially circular steam sparger.

26. The method of claim 8, wherein the steam sparger is a substantially elliptical steam sparger.

27. The method of claim 8, wherein the steam sparger comprises two steam spargers.

28. The method of claim 1, wherein the steam sparger comprises a series of 2, 3, 4, 5, or 6 steam spargers.

29. The method of claim 1, wherein a pH of the waste peptone is about pH 12-13 at a beginning of the process, preferably at time t=0 minutes.

30. The method of claim 29, wherein the pH of the waste peptone is reduced from about pH 12-13 at the beginning of the process to about pH 7 at the end of the process at a time=30-60 minutes.

31. The method of claim 1, wherein the processed waste peptone has a bacterial count of less than about 20,000 CFU/g.

32. The method of claim 1, wherein the processed waste peptone is substantially odor free.

33. The method of claim 15, wherein the waste peptone is added to a top of the thermally insulated tank.

34. The method of claim 1, wherein the heating process is repeated.

35. The method of claim 34, wherein the method is repeated 1, 2, 3, 4, 5, 6, 7, 8, 9, or 10 times per batch of waste peptone.

36. The method of claim 1, wherein the method is a batch process.

37. The method of claim 1, wherein the resultant waste peptone is safe to discharge as regular waste water.

38. A method for reducing the enzymatic activity of waste peptone, comprising:
(a) obtaining waste peptone;
(b) placing the waste peptone into a thermally insulated tank, the thermally insulated tank including a steam sparger disposed at a bottom of the thermally insulated tank and spaced from a bottom surface of the thermally insulated tank;
(c) directly injecting steam into the waste peptone in the thermally insulated tank via the steam sparger to heat the waste peptone to about 175-190° F. for about 15-45 minutes;
(d) recirculating the waste peptone from an area at or near a bottom of the thermally insulated tank to an area at or near a middle of the thermally insulated tank via a recirculation pump fluidically coupled to the thermally insulated tank; and
(e) collecting gases produced from the thermally insulated tank.

39. The method of claim 38, wherein the waste peptone is generated by a heparin extraction process.

40. The method of claim 38, comprising repeating steps (a)-(e) 1, 2, 3, 4, 5, 6, 7, 8, 9, or 10 times.

41. The method of claim 1, wherein the steam sparger is spaced from the bottom surface of the tank by about 1 inch.

42. The method of claim 1, wherein the steam sparger is spaced from the bottom surface of the tank by about 2-3 inches.

* * * * *